Patented Feb. 24, 1925.

1,527,868

UNITED STATES PATENT OFFICE.

MAX HARTMANN AND HANS KÄGI, OF BASEL, SWITZERLAND, ASSIGNORS TO THE SOCIETY OF CHEMICAL INDUSTRY IN BASLE, OF BASEL, SWITZERLAND.

N-CARBOXYLIC-ACID ESTERS OF ASYMMETRICALLY-SUBSTITUTED ETHYLENE DI AMINES AND PROCESS FOR THE MANUFACTURE THEREOF.

No Drawing.  Application filed January 30, 1923. Serial No. 615,937.

*To all whom it may concern:*

Be it known that we, MAX HARTMANN and HANS KÄGI, both citizens of the Swiss Republic, and residents of Basel, Switzerland, have invented new and useful N-Carboxylic-Acid Esters of Asymmetrically-Substituted Ethylene Diamines and Processes for the Manufacture Thereof, of which the following is a full, clear, and exact specification.

We have found that N-carboxylic acid esters of asymmetrically substituted ethylene diamines can be obtained by causing an ester of a halogenoformic acid to act on an asymmetrically substituted ethylene diamine.

When there is added to a solution of an asymmetrically substituted ethylene diamine, for instance asymmetrically substituted diethyl-ethylene diamine, an equimolecular proportion of an ester of chloroformic acid, for instance the benzyl ester, the following reaction occurs:—

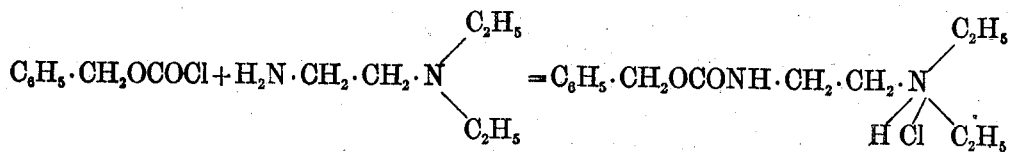

that is to say, there is formed the hydrochloride of a basic urethane. When 2 molecular proportions of the chloroformic acid ester are used for each molecular proportion of the diethyl-diethylene diamine, or a further molecular proportion of the chloroformic acid ester is allowed to act on the above urethane, there is produced the corresponding iminodicarboxylic acid ester—

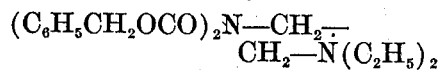

This latter compound is produced in small proportion even when the parent compounds react in equimolecular proportions. The reaction may occur in water or in an organic solvent such as ether or benzene. When water is used, there is obtained a solution of the hydrochloride, from which the free base can be precipitated in the form of an oil by addition of an alkali, such as caustic soda solution. When a solid halogenoformic acid ester is used the reaction may be facilitated by adding to the aqueous mixture a small proportion of an organic solvent, such as ether or benzene.

The free bases are oils which cannot be distilled under ordinary pressure and are insoluble in water, but soluble in most organic solvents.

Among the salts those formed with halogen acids are generally easily soluble in water, and some of the salts dissolve also in organic solvents. Some of them can be crystallized from their solutions while others are obtained in amorphous form.

The new compounds find application in therapeutics.

The following examples illustrate the invention, the parts being by weight:—

*Example 1.*

Into a solution of 116 parts of asymmetrical diethyl-ethylene diamine in 1160 parts of water, are dropped 170.5 parts of benzyl chloroformate, while stirring and cooling with ice. After the reaction dilute hydrochloric acid is added until the solution is distinctly acid to Congo, and non-basic products are extracted by shaking with ether. The aqueous solution is made alkaline with caustic soda solution and the urethane-base which is thus precipitated is taken up with ether. The residue left on evaporating the ether is dissolved in ethyl acetate and the solution is acidified with alcoholic hydrochloric acid; after some time the hydrochloride of the diethylamino-ethyl carbamic acid benzyl ester crystallizes. This forms, when crystallized from water, very easily soluble crystals melting at 105–106° C.

The base is a colorless and nearly odourless oil which boils at 127° C. under 0.015 mm. pressure.

*Example 2.*

184.5 parts of the phenyl ethyl ester of chloroformic acid (b.p.10 111–113°) are dropped, while stirring and cooling with ice, into a solution of 128 parts of ω-amino-N-ethyl-piperidine in 1280 parts of water. The reaction mixture is worked up as described in Example 1.

The piperidyl-N-ethylcarbamic acid phenyl ethyl ester thus obtained is a viscid, clear oil which boils at 152° C. under 0.015 mm. pressure.

The hydrochloride separates from a cooled solution of the base in hydrochloric acid, in the form of a powder containing water of crystallization; it melts, but not sharply, at 60–75° C.

Example 3

Dimethylamino-ethyl-carbamic acid benzyl ester is made in the form of a viscid, clear oil, from 88 parts of asymmetrical dimethylethylene-diamine and 170.5 parts of chloroformic acid benzyl ester, in manner analogous to that described in Example 1.

The hydrochloride is a syrupy, hygroscopic substance.

Example 4.

20.8 parts of the menthyl ester of choroformic acid are dissolved in 50 parts of ether and the solution is shaken for some time with a solution of 11.6 parts of asymmetrical diethylethylene-diamine in 120 parts of water while cooling with ice. After addition of hydrochloric acid until the liquid is distinctly acid to Congo, all volatile constituents are distilled in steam. By adding common salt to the residue, the hydrochloride is salted out in the form of an oil and can be extracted by shaking with ethyl acetate. When the solvent has been evaporated the hydrochloride of diethylamino-ethyliminodicarboxylic acid menthyl ester separates in the form of an amorphous mass. Caustic soda solution precipitates the base from the solution of the hydrochloride in the form of a very viscid oil which distils, not wholly undecomposed, at about 170° C. under 0.02 mm. pressure. From the solution which has been extracted with ethyl acetate there may be precipitated, by adding caustic soda solution, the diethylamino-ethyl-carbamic acid menthyl ester in the form of an oil which boils at 142° C. under 0.015 mm. pressure.

Example 5.

11.6 parts of asymmetrical diethylethylene diamine and 17.6 parts of chloroformic acid hexahydrobenzyl ester are caused to react in the manner described in Example 1.

The diethylamino-ethylcarbamic acid hexahydrobenzyl ester thus obtained is a viscous clear oil which distils without decomposing, at 150° under 0.05 mm. pressure.

The hydrochloride is soluble in water, alcohol, benzene, toluene and even in light petroleum.

Example 6.

116 parts of asymmetrical diethyl-ethylenediamine are dissolved in 400 parts of ice and 100 parts of water, 184.5 parts of the phenyl ethyl ester of chloroformic acid are added in one dose and the whole is stirred for an hour. The base is now precipitated by adding caustic soda solution, extracted with ether and dried over potash. After evaporation of the ether the base is distilled in a vacuum. The diethylamino-ethylcarbamic acid phenyl ethyl ester boils at 147° under 0.025 mm. pressure and is a colourless, nearly odourless oil.

The hydrochloride is obtained in the form of an amorphous, hygroscopic mass, easily soluble in most solvents.

Example 7

116 parts of asymmetrical diethylethylene-diamine are dissolved in 400 parts of ice and 100 parts of water and there are added, while stirring, 370 parts of chloroformic acid phenyl ethyl ester, 400 parts of caustic soda solution of 10 per cent strength being simultaneously dropped in. Excess of alkali is now added, the base is extracted with ether and the ethereal solution dried over potash. After evaporating the ether the residue is distilled in a vacuum. The diethylamino-ethylimino-dicarboxylic acid phenyl ethyl ester is thus distilled at 200°–202° C. under 0.05 mm. pressure.

The same compound is obtained when 1 molecular proportion of diethylamino-ethylcarbamic acid phenyl ethyl ester is caused to act on 1 molecular proportion of chloroformic acid phenyl ethyl ester.

What we claim is:—

As new products of manufacture, the herein described N-carboxylic acid esters of asymmetrically substituted ethylene diamines, obtained by reaction of an ester of a halogenoformic acid on an asymmetrically substituted ethylene diamine, having valuable therepeutical properties and constituting in the form of the free bases oils insoluble in water, but soluble in most organic solvents, in the form of their salts, solid bodies generally easily soluble in water, in part also soluble in organic solvents.

In witness whereof we have hereunto signed our names this 12th day of January, 1923, in the presence of two subscribing witnesses.

MAX HARTMANN.
HANS KÄGI.

Witnesses:
AMAND BEAM,
JULIA DURST.